(12) United States Patent
Coryell et al.

(10) Patent No.: US 7,140,014 B2
(45) Date of Patent: Nov. 21, 2006

(54) SYSTEM AND METHOD FOR PROVIDING A FLEXIBLE FRAMEWORK FOR REMOTE HETEROGENEOUS SERVER MANAGEMENT AND CONTROL

(75) Inventors: Larry G. Coryell, Sunnyvale, CA (US); Sriranga R. Veeraraghavan, San Jose, CA (US); Philippe Ploquin, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 771 days.

(21) Appl. No.: 10/325,228

(22) Filed: Dec. 18, 2002

(65) Prior Publication Data

US 2004/0122924 A1 Jun. 24, 2004

(51) Int. Cl.
*G06F 9/445* (2006.01)
*G06F 15/173* (2006.01)
*G06F 3/00* (2006.01)

(52) U.S. Cl. .............. 717/176; 709/223; 719/317

(58) Field of Classification Search .............. 717/176, 717/177; 707/102; 709/223; 719/317
See application file for complete search history.

(56) References Cited

U.S. PATENT DOCUMENTS 5,799,016 A * 8/1998 Onweller .................. 370/401
6,470,375 B1 * 10/2002 Whitner et al. ............. 718/105
6,675,205 B1 * 1/2004 Meadway et al. .......... 709/219
6,704,873 B1 * 3/2004 Underwood ................ 726/12
2003/0004961 A1 * 1/2003 Slothouber et al. ......... 707/100
2005/0273779 A1 * 12/2005 Cheng et al. ............... 717/168

* cited by examiner

*Primary Examiner*—Tuan Dam
*Assistant Examiner*—Isaac Tecklu
(74) *Attorney, Agent, or Firm*—Park, Vaughan & Fleming LLP (57) ABSTRACT

One embodiment of the present invention provides a system and method for providing a flexible framework for remote heterogeneous server management and control. A user interface framework is generated to export control and display features in a user interface effecting task execution and management of one or more remote heterogeneous agents responsive to user interaction. A management station framework is executed and includes services and base management functions implemented in management modules. The management station framework further generates the control and display features of the user interface and maintains a database storing management information. An agent framework provides execution of commands to control and return of results from one or more agents. The agent framework further includes an interface loading and accessing agent code located on one or more applications deployed to each agent.

36 Claims, 8 Drawing Sheets

SYSTEM AND METHOD FOR PROVIDING A FLEXIBLE FRAMEWORK FOR REMOTE HETEROGENEOUS SERVER MANAGEMENT AND CONTROL

BACKGROUND

1. Field of the Invention

The present invention relates in general to remote heterogeneous server management, and, in particular, to a system and method for providing a flexible framework for remote heterogeneous server management and control.

2. Background

Interconnected networks of computer systems form the backbone of modern corporate information technology systems. These networks are typically composed of legacy systems, mid-range servers and individual personal computers interconnected via local area or intranetworks and wide area or internetworks, including the Internet. Although the configurations and topologies of each corporate networking system are unique, the underlying architectures of the network services provided over each networking system are generally standardized.

Network services are provided through standardized network protocols. The most common suites of network protocols are the Transmission Control Protocol/Internet Protocol (TCP/IP) and User Datagram Protocol (UDP) suites, which are loosely based on the OSI/ISO seven-layer network model, such as described in W. R. Stevens, "TCP/IP Illustrated, Vol. 1, The Protocols," Ch. 1–3, Addison-Wesley (1994), the disclosure of which is incorporated by reference. In the TCP/IP protocol suite, functionality is assigned to four separate layers: link, network, transport, and application. Each layer performs specific responsibilities and exports well-defined interfaces to neighboring layers. In particular, the Simple Network Management Protocol (SNMP) is an application layer UDP protocol that provides a hierarchical management framework between network management stations (managers) and network elements (agents), such as described in Ibid at Ch. 25, the disclosure of which is incorporated by reference.

Similarly, Web browsers have gained wide acceptance for providing a de facto standardized user interface for presenting various forms of information on computer systems in a platform-independent manner. Web browsers rely on information written in formatted page description languages, such as the Hypertext Markup Language (HTML), which is communicated between network nodes via the Hypertext Transport Protocol (HTTP), also an application layer TCP/IP protocol, such as described in W. R. Stevens, "TCP/IP Illustrated, Vol. 3, TCP For Transactions, HTTP, NNTP, and the UNIX Domain Protocols," Ch. 17, Addison Wesley (1996), the disclosure of which is incorporated by reference. When combined with SNMP applications, Web browsers displaying information implemented in HTTP can provide a portable environment for remote system management.

A typical computer network arrangement can include a collection of heterogeneous computing systems manufactured by various hardware vendors and executing operating systems and application programs written by several different software vendors. Interconnectivity between the heterogeneous systems is achieved using the TCP/IP protocol suite, which abstracts the system-unique characteristics up through the application layer. However, once outside the ambit of the TCP/IP protocol suite, operations can become environment-dependent and system-specific. By nature, management operations tend to be platform-dependent. Consequently, providing management support to an installed base of computing systems can still require significant effort, as application-layer management applications must be tailored to operate in each deployed environment.

Ad hoc solutions to providing platform-independent management development and deployment focus primarily on a centralized management console paradigm, such as SNMP. Environment-specific agents software must be written and deployed to each supported platform, thereby increasing cost, complexity and maintenance. Moreover, the range of management functions is limited to those specifically provided by the SNMP protocol and cannot be generalized to facilitate a broader scope of control.

Therefore, there is a need for a decentralized architecture for managing heterogeneous systems with centralized control and platform independence. There is a further need for a system-independent management platform describing management application programs operable as independently configurable and monitorable network management components.

SUMMARY

One embodiment of the present invention provides a system and method for providing a flexible framework for remote heterogeneous server management and control. A user interface framework is generated to export control and display features in a user interface effecting task execution and management of one or more remote heterogeneous agents responsive to user interaction. A management station framework is executed and includes services and base management functions to support system management applications implemented as management modules. Services include server acquisition and module distribution to the remote heterogeneous managed servers, group operations, scheduling management tasks, and task event tracking. The management station framework further generates the control and display features of the user interface and maintains a database storing management information. An agent framework provides execution of commands to control and return of results from one or more agents. The agent framework further includes an interface loading and accessing agent code located on one or more applications deployed to each agent.

In a variation on this embodiment, the user interface is presented as at least one of a graphical user interface and a command line interface.

In a variation on this embodiment, the control and display features of the user interface are specified as an executable script.

In a variation on this embodiment, the management server framework is defined to provide at least one management function selected from the group comprising acquisition of new management servers to be managed under the management station framework, providing a process manager enabling script and object code registration and scheduled execution, providing an interface to a database under the management station framework storing information about managed servers and server specific information, providing an interface comprising of allowing each application to display alerts and to log text messages, providing an interface to at least one such agent to enable direct interaction with an server, and providing an interface to an server to enable direct retrieval of information stored in a database under the management station framework.

In a variation on this embodiment, agent control definitions define the agent control commands to provide at least one agent function selected from the group comprising a package manager installing and removing packages on behalf of a module manager and keeping track of at least one management station that has packages installed, an agent ping module contacting at least one agent to verify connectivity, a set agent password module setting an agent password, a change agent password module changing the agent password, a get agent version control getting a version of a specific agent, and a get registered packages module querying a list of installed management packages.

In a variation on this embodiment, a software management application is provided to upgrade software on a list of managed servers and includes a software management application function selected from the group comprising at least one of obtaining a list of installed software from a set of the managed servers, obtaining a set of available upgrades from an update server, and upgrading the installed software on the set of the managed servers.

In a variation on this embodiment, a management application is provided to monitor a list of managed servers through polling each server for a status update or through an asynchronous status update from the managed servers.

In a variation on this embodiment, a management application is provided to store inventory information about server composition and includes an inventory application function selected from the group comprising at least one of generating a hardware report and generating a software report.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Framework For Remote Heterogeneous agent Management

Figure 1:
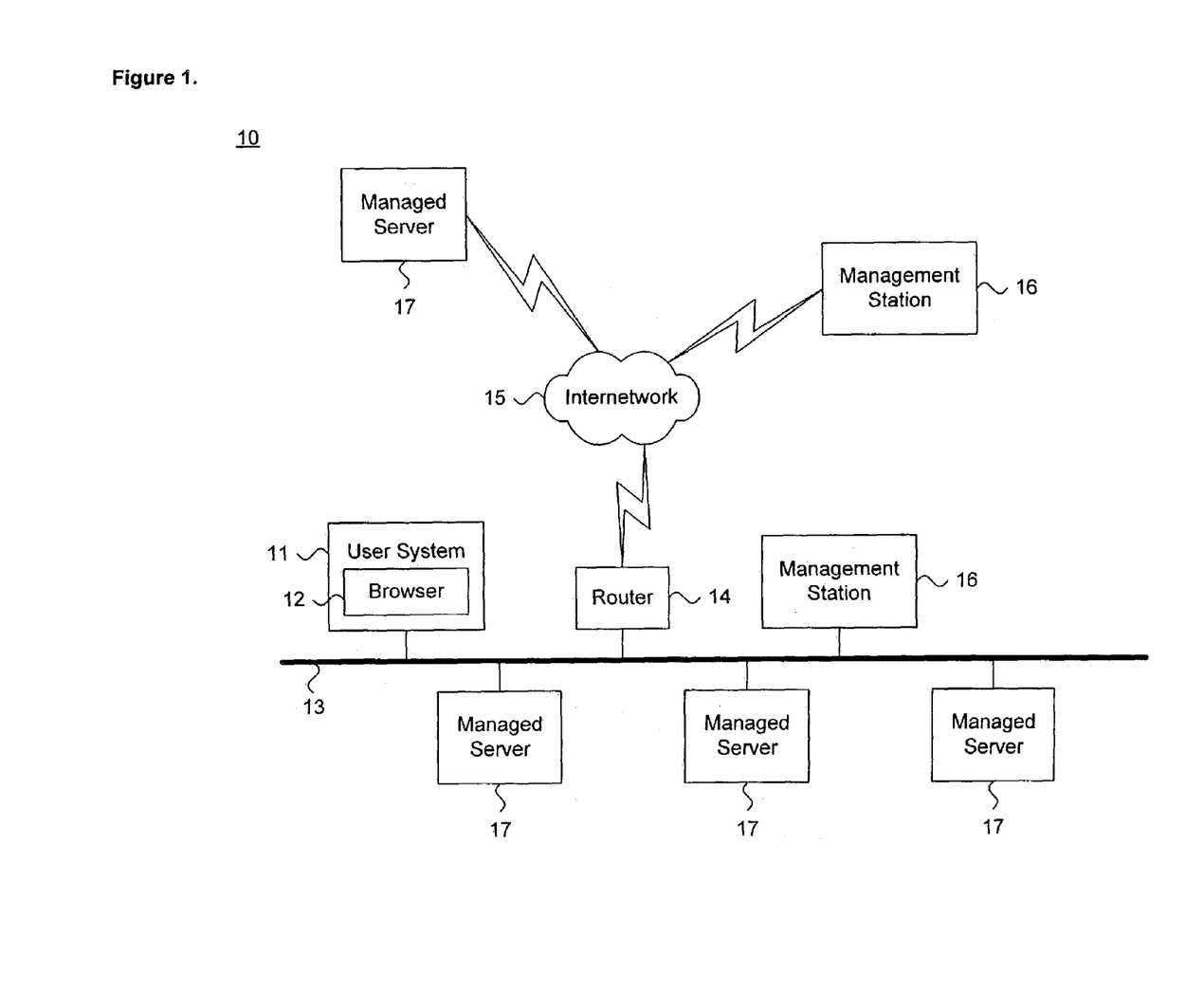
FIG. 1 is a block diagram showing a system for providing a flexible framework for remote heterogeneous server management and control in accordance with an embodiment of the present invention.

FIG. 1 is a block diagram showing a system for providing a flexible framework for remote heterogeneous server management and control 10 in accordance with an embodiment of the present invention. The system 10 consists of three main component groups: user system 11, management station 16, and managed server 17. Note the system 10 can consist of one or more instances of each component, which each can be executing on an individual or combined computing platform.

The user system 11 provides a user interface through which management and control functions are specified and results are viewed. In the described embodiment, the user system 11 executes a Web browser (Browser) 12, such as the Internet Explorer, licensed by Microsoft Corporation, Redmond, Wash., or Navigator, licensed by Netscape Corporation, Santa Clara, Calif. The user system 11, using the browser 12, provides a graphical user interface (GUI), through which management functions can be transacted and monitored.

Alternatively, management functions can be executed using a command line interface (not shown) on the management station 16.

Each management station 16 generates the user interface presented on the user system 11 and performs requested management and control functions responsive to inputs on the user interface. In the described embodiment, the user interface is generated through HTML scripts, which are downloaded to the Web browser 12 to provide a platform-independent user interface. Each management station 16 can be located either locally over an intranetwork 13 or remotely over an internetwork 15, such as the Internet, by way of a router 14.

Each managed server 17 performs a function and optionally returns a result responsive to commands received from the user system 11 via the management stations 16. Each managed device can be located either locally over the intranetwork 13 or remotely over the internetwork 15. Other configurations, topologies, and arrangements of system components and interconnections are feasible, as would be recognized by one skilled in the art.

To provide optimum flexibility and throughput, each management station 16 can execute independently of any other management station 16 and can manage, control and monitor independent tasks on one or more of the managed servers 17. Thus, throughput is enhanced by allowing decentralized management functionality at each management station 16 while retaining centralized control via the user system 11.

Framework Architecture

Figure 2:
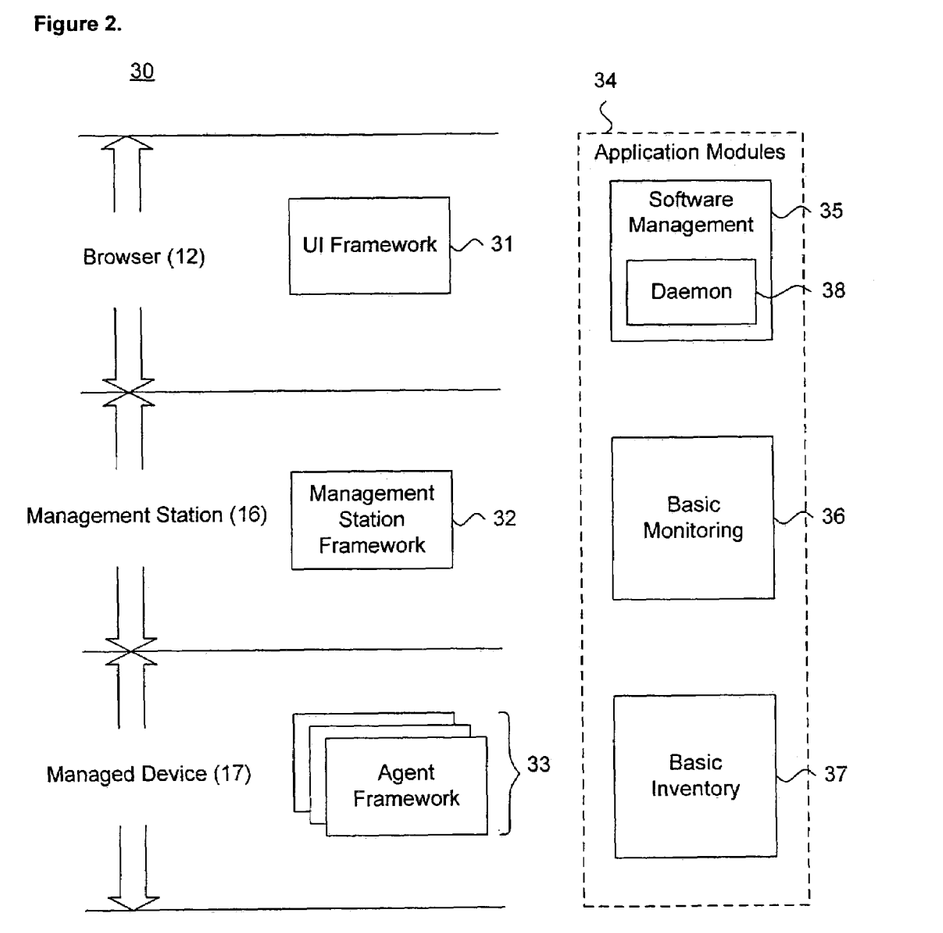
FIG. 2 is a block diagram showing a framework architecture for the components of the system of FIG. 1.

FIG. 2 is a block diagram showing a framework architecture 30 for the components of the system 10 of FIG. 1. The framework architecture 30 consists of three interrelated frameworks: user interface (UI) framework 31, management station framework 32, and agent framework 33. Briefly, the UI framework 31 is the top layer framework and facilitates processing of orders, task control, and general user interface layout. The management station framework 32 provides a database interface, task and process management, event processing, and application module loading and unloading. Each agent framework 33 provides the actual agent for the managed application. There can be several independent agent frameworks 33. The framework architecture 30 also includes application modules 34, which are installed as individual application packages. The frameworks 31, 32, 33 and application modules 34 will now be discussed in detail.

User Interface Framework

In the described embodiment, the UI framework 31 is a Web-based user interface, which executes applets to provide task execution and management, server management, and alarms. The user interface is launched as a Uniform Resource Identifier (URI) received from the management station 16. The user interface provides framing within the Web browser 12 and presents an initial screen to the operator, including tasks, buttons, tabs, and related presentation components, as further described below with reference to FIG. 5.

Management Station Framework

The management station framework 32 executes on a management station 16 and consists of a set of services and base management functions. The services and base management functions support management application modules, which are further described below with reference to FIG. 4.

The services provided by the management station framework 32 include database, task and process management, logging, alarm triggers, and interfacing in a secure and authenticated manner with managed servers 17 via remote agents. The base management functions include importing or server acquisition, management station administration, application module loading and unloading, and event presentation. The services and base management functions will now be discussed in detail.

Import or Server Acquisition Service: Brings in new servers to be managed by a management station 16. This service imports servers either from a comma-separated flat file or through a prompted GUI. The GUI allows importing of a list of IP addresses. The Import service verifies the accessibility of each new managed server 17, determines the model and version of the server, downloads the appropriate agent routines, and makes the server "managed." A managed server 17 identifier is passed to the Module Manager, described below, to add the installed module agent code. The user is notified of any errors in importing. The model and version of the server is used to identify the correct application package to download.

Module Manager: Includes the ability to install and remove Management Modules on a base station. This base management function automatically adds and removes modules from remote managed servers 17 and tracks the number of installations of modules on the target servers. The Module Manager also provides manual addition and removal of modules on remote managed servers, as well as providing failed installation retry on managed servers.

Scheduler: Provides a process manager for the processes used by a management station 16. The Scheduler implements a library interface to allow applications to register scripts or object code for execution at a scheduled time. Applications can execute synchronously or exit immediately and rely on the Scheduler to handle process execution and completion.

Database Interface Library: Allows applications to interact with the management station database engine to obtain stored information about managed servers 17 and application-specific information. In the described embodiment, the database access routines are encapsulated, thereby allowing interchangeable database implementations. Retrievable information includes the list of managed servers, the groups of managed servers, usernames and passwords, and so forth.

Logging Interface Library: Allows applications to log text messages to the database on a management station 16, as well as to text files. A base management function provides the user interface for viewing the messages.

Agent Interface Library: Allows applications on a management station to interact directly with an agent on an server. The Agent Interface module contains the low level system calls to connect to, execute commands on, and obtain a status from an server. The Agent Interface module provides the following basic commands: Download a File; Get a File; and Execute a File; plus provide a set of agent Control commands.

Agent Framework

Each agent framework 33 has an interface on a management station 16 and on an server agent located on the managed server. This interface allows the installed management applications to access code located in the managed server 17 and acquire data about the server. The code is loaded and executed through the server agent. The primary goal of each agent is to execute commands in a secure fashion and return results back to the requesting management station 16. In the described embodiment, the following functions are provided to support agent control:

Package Manager: Installs and uninstalls management packages on behalf of the Module Manager, described above. The Package Manager also keeps track of the number of times the packages have been installed by a management station for providing safe removal.

Agent Ping: Contacts an agent via a port to verify connectivity.

Set Agent Password: Sets the agent password. In the described embodiment, the agent password is a secret password shared by the management station and the agent with each management station-agent pair having a separate secret password. The agent password is not the same as the admin or root password used on a server and cannot be used to log into the system via other channels.

Change Agent Password: Changes the agent password.

Get Agent Version: Gets the version of an agent.

Applications

In the described embodiment, three primary management application modules are provided: software management 35, basic monitoring 36, and basic inventory 37. The application modules 35, 36, and 37 will now be discussed in detail.

Software Management Application Module 35: This application module is designed to allow operators to upgrade the software on a list of deployed servers. The software management application 35 also provides reporting to enable an operator to identify software installed on each managed server. The software management application 35 supports the following functions:

Get Installed Software: Allows an operator to obtain a list of installed software on a set of managed servers.
  Get Upgrades: Allows an operator to obtain and optionally store the set of available upgrades from an update server for a given server type or for all server types.
  Update Software: Allows an operator to upgrade the software on a set of managed servers.

In addition, the software management application 35 includes a daemon 38 that periodically connects to an updates server to maintain a list of new updates based on server type.

Basic Monitoring Application Module 36: This application module monitors a list of servers by periodically polling each server for an update to the server status. This module also provides an asynchronous message system to allow the remote managed server 17 to notify the management station of any health alerts. The polling is provided by using either a "Ping" to verify that the agent is running and that the connection is available or through the acquisition of the health status data.

Basic Inventory Application Module 37: This application module provides basic inventory functions.

Hardware Report Module (not shown): Generates a report that provides a summary of the hardware composition for a set of managed servers, including the hardware configuration, such as the number of hard drives, CPUs, memory, and so forth.

Application Package

Figure 3:
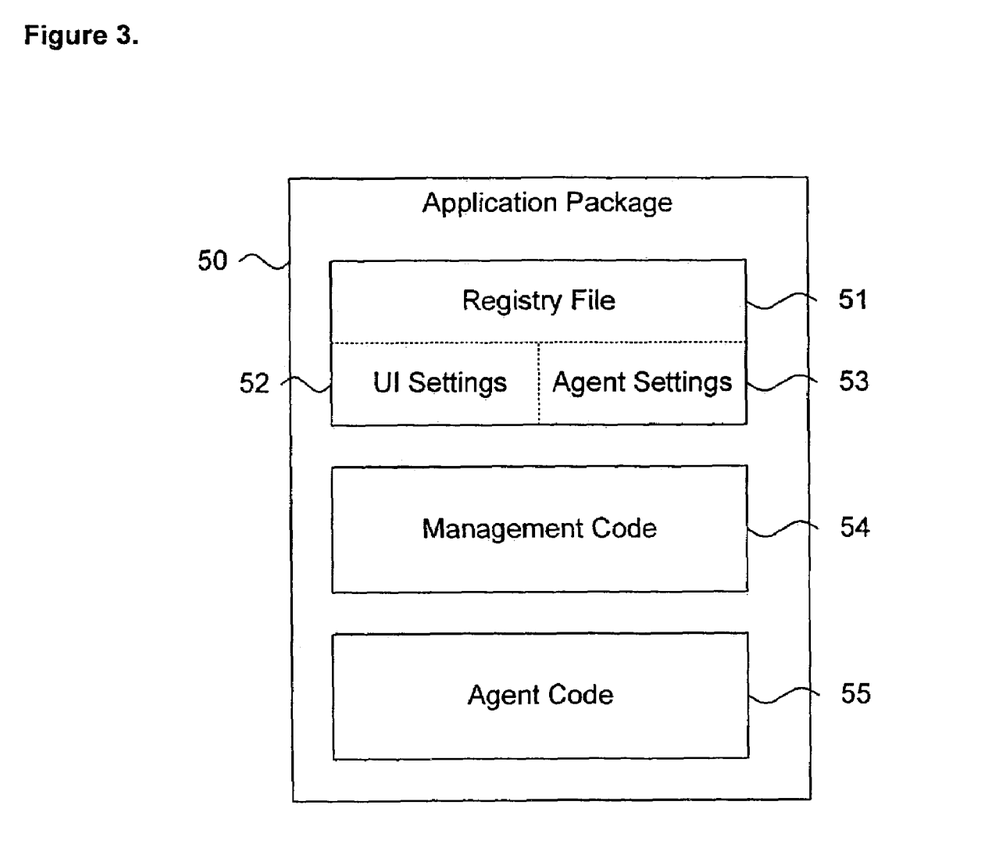
FIG. 3 is a data structure diagram showing an application package used by the system of FIG. 1.

FIG. 3 is a data structure diagram showing an application package used by the system of FIG. 1. Each application package 50 is used to install the appropriate components for a user interface, application code, and agent code. In the described embodiment, each application package 50 is specified in an archive containing an XML-based registry file 51, management code 54, and agent code 55. The registry file 51 contains the application relationships between the UI and management code and for each agent.

In each registry file 51, a UI settings portion contains specifications for the tasks to be placed in a task frame of the UI framework 31 (shown in FIG. 2) and includes text for the task, icon, URI used to invoke the task, and control data. When the registry file 51 is read, the contents are parsed and placed in a database for retrieval by the base user interface. The control data specifies operational functions for the application packages, which include initialization and removal actions and UI control. UI control includes the ability to launch the server manager (not shown), which provides a server selection mechanism to the operator.

The registry file 51 also includes an agent settings portion 53 that specifies scripts or executable code to move to a particular server upon management. The versions of supported servers are specified as part of the accompanying agent code 55 to download. Using the import function, servers can be placed under management. When a server is added, the server type is determined and is used to download the appropriate agent code 55 to the server.

Each new application requires an application package 50 to be installed on a management station 16. The management station framework 32 provides the appropriate capabilities to permit the downloading and installation of an application package 50 on a management station 16.

Application Package Installation

Figure 4:
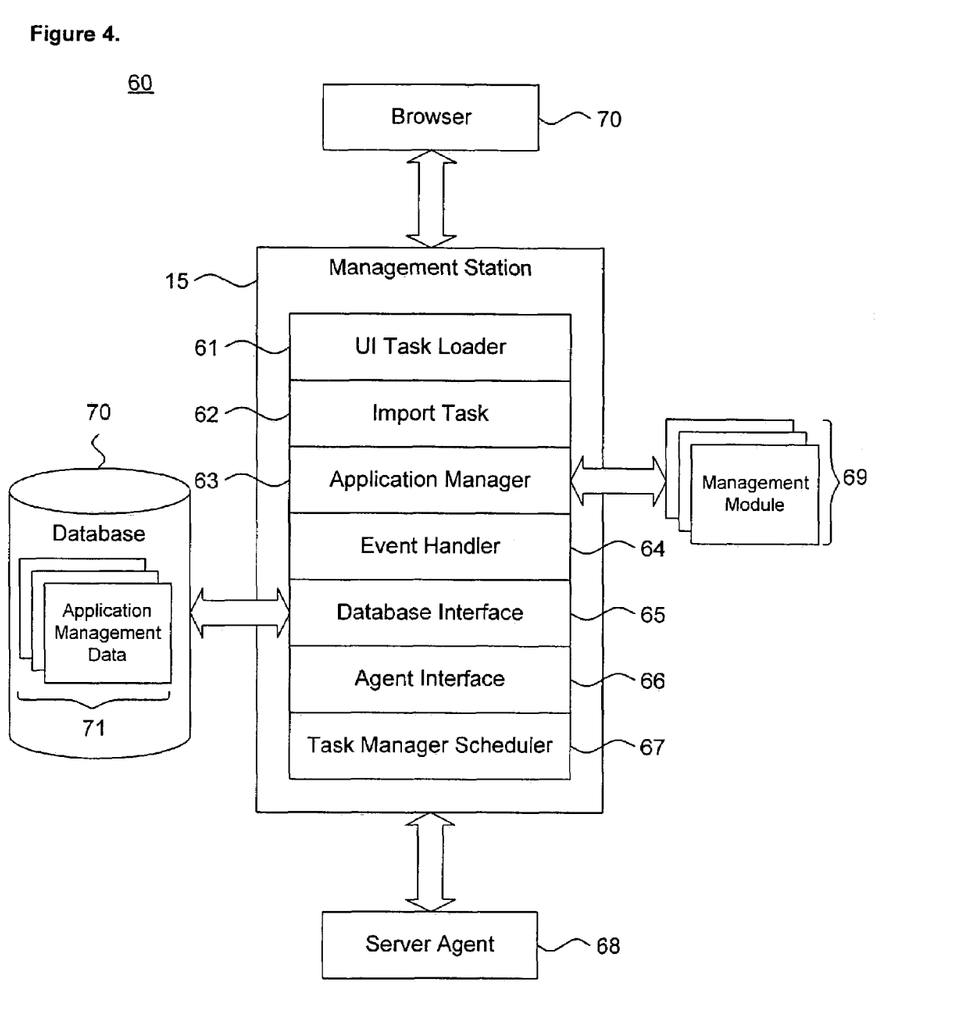
FIG. 4 is a block diagram showing the software modules implementing the management station used by the system of FIG. 1.

FIG. 4 is a block diagram showing the software modules implementing the management station used by the system of FIG. 1. There are two mechanisms used for installing the agent code 55 contained within an application package 69 onto a server. The first mechanism allows for the installation of the agent code 55 onto a server when the appliance package is added to the management station 15. The second mechanism allows for the installation of the agent code 55 onto a server when the server is added to the management station 15.

To install an application package on the management station, the operator accesses a UI task loader 61 to upload an archive containing the application package. A task manager scheduler 67 then starts an instance of the application manager 63, which handles installation of application packages. During installation, the application manager 63 first verifies the archive and extracts and installs the components into appropriate locations on the management station 15. Next, application management data 71 stored in the database 70 is updated with the information contained in the registry file using the database interface 65. The application manager 63 then creates a list of those servers that do not have the application installed. For each server, the application manager 63 contacts a server agent 68 running on the server using the agent interface 66. The application manager 63 determines whether the application needs to be installed on the server and proceeds with the installation, if required. The database 70 is updated if the installation fails or the server could not be contacted. As each server is processed, the status of the installation is logged using the logging mechanism provided by the base management station framework. Once all servers have been processed, the task manager scheduler 67 is notified that the task has completed.

To add a server to the management station, the operator accesses the UI task loader 61 and specifies the server parameters required to manage that server. The task manager starts an instance of the import task 62, which is responsible for contacting the server and determining the server type. Once the server type is known, the import task 62 invokes the application manager 63, which is responsible for installing the agent code 55 (shown in FIG. 3) appropriate to that server for each application installed on the management station 15. The application manager 63 uses the server type to create a list of all the agent code 55 appropriate for that server type. Using the agent interface 66, the application manager 63 downloads and installs the agent code 55 for each application to the server. As each server is processed, the status of the installation is logged using the logging mechanism provided by the base management station framework. Once all the servers have been processed, the task manager scheduler 67 is notified that the task has completed.

Base User Interface

Figure 5:
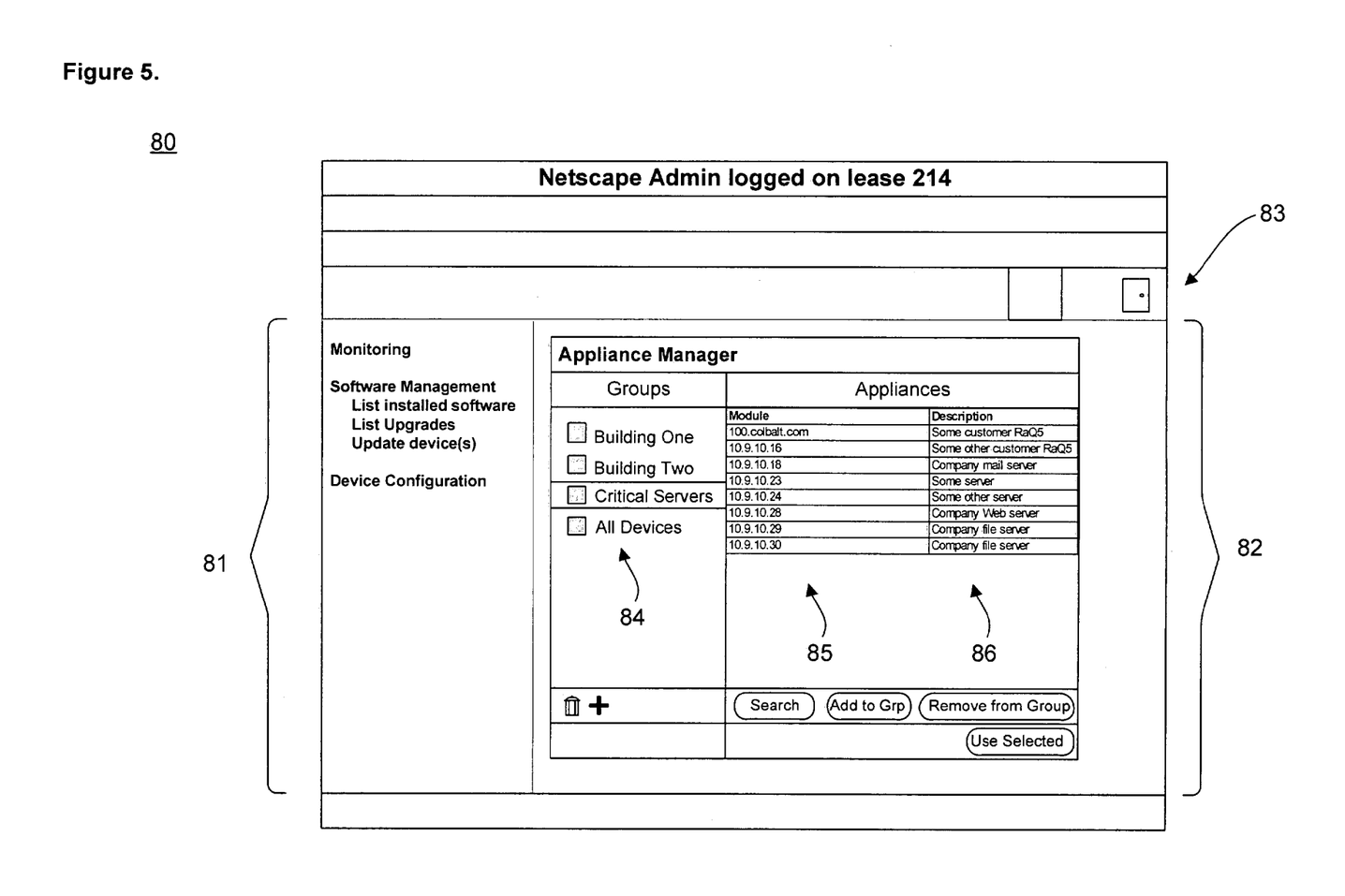
FIG. 5 is a screen shot showing, by way of example, a base user interface used by the system of FIG. 1.

FIG. 5 is a screen shot showing, by way of example, a base user interface 80 used by the system of FIG. 1. The base user interface 80 is logically divided into three main areas: task frame 81, presentation frame 82, and alert indications 83. The task frame 81 presents tasks available to an operator for execution. The task frame 81 is populated using task data stored in the management station database 70 upon launching of the base user interface 80. Associated task frame scripts handle the organization of tasks into task folders, which allow grouping of tasks under a single heading.

Operationally, the operator selects a task within the task frame 81, which launches an associated URI in either the presentation frame 82 or in an external Web browser (not shown). In addition, the task frame 81 supports launching of URIs, help links, pass-over help text, and launch targeting. Application attributes and expected behaviors are specified in an associated registry file 51.

The task frame 81 can also be used to pass environment data to applications. The individual tasks identified in the task frame 81 are specified using a UI registry file 51 delivered with each application package 50 (shown in FIG. 3). In the described embodiment, each UI registry file 51 is an XML-based file describing the folders and tasks to perform, including the name, icon and associated tasks. An example UI registry file 51 consists of the following:

```
<folder>
    <foldername value= "Software Management"/>
    <folderDesc value= "Software management is for updates and
        patches"/>
    <folderHelp value = "/SWM/help.pl/>
    <folderAccess value = 10/>
    <tasks>
        <taskname name value = "Check SW updates"/>
        <taskURL value = "/SWM/checkSwUp.pl"/>
        <taskHelpUrl value= "/SWM/helpme.pl"/>
        <taskDescValue= "This is a description for
tooltip"/>
        <taskAccess value=10/>
        <taskAm value=TRUE/>
        <taskTarget value = EXT/>
    </tasks>
    <task>       . . .       </task>
</folder>
```

Tasks can be grouped together in Task folders. Each task group can consist of the following attributes:

Name (folderName): The string displayed in the tree for this group (usually the Application name).
Desc (folderDesc): A brief description of the Task Folder (tool tip).
Help folderHelp): Link to the help page for this folder.
Access level (folderAccess): A number that defines the minimum permission level required to access the Task Folder.
Id (supplied by system): An identifier used by the mapping table to identify the Task Folder. The management station 16 automatically defines the identifier when an application is installed.

Each task is associated with a URI that is defined for a specific application and is defined by the following attributes:

Name (taskName): The string displayed in Task frame
URL (taskUrl): The URI that corresponds to the Task.
Help URI (taskHelpUrl): The URI that corresponds to an online help page.
Id/Tag (provided by system): A string used to represent the URI. Also used for launching the corresponding online help page. This tag is automatically generated by the management station 16 when the application package is installed.
Desc (taskDesc): A short description of the Task for tool tip.
Access level (taskAccess): A number that defines the minimum permission level required to access the Task.
Server Mgr (taskAm): A flag that indicates whether the server manager is required for this Task.
Target (taskTarget): Specifies where to launch the URI. The possibilities are PRES or EXT: PRES for right hand presentation frame and EXT for an external browser.

The presentation frame 82 lists out the groups and servers currently under management and allows individuals or groups of servers to be manipulated and controlled. Manipulation includes deleting or adding managed servers, and searching, group operations, and use of selected servers is also supported.

The presentation frame 82 is logically divided into three columns identifying a list of groups 84, server list 85, and description of servers 86. The list of groups 84 identifies groups that currently exist under management, as well as an always-present "All Devices" group. When a groups or subgroups are selected, the servers in the subgroups or groups are presented in the server list column 85 and description of server column 86. Each server is identified by IP address or host name, based on the type of identifier discovered when the server was imported. The description of server column 86 displays a description previously entered by an operator when the server was imported or via an administration screen. The following functions are provided:

Search: Searches the groups and servers for a string match.
Add to Group: Allows a user to add a group name. The user selects the servers to group. The user is then asked for the group name. The group is then added to the management server and the database 70 are updated to reflect the change.
Remove from Group: Allows the user to delete a group or remove servers from a group. The user selects the group in the Group column. The servers in that group are presented in the Server column. The user then selects the servers to remove. If all the servers are selected, the group is removed. The user is prompted to verify any removals.
Use Selected: Launches the application URI passing on the selected servers and groups.

Managed Server

To the server manager, a managed server 17 has an installed and running management agent. An server is defined by a set of attributes, consisting of at least the following:

name/address: The DNS hostname or IP address of the server.
id/tag: An identifier used to map an server into Server groups. The identifier is assigned automatically.
Admin username: The username of the administrator for an server.
Admin password: The password of the admin user on an server. type id: Used to determine the type of the server.
Description: Text describing the server. Entered by User.

This data is acquired from a base set of agent scripts and accessed when the server is "added" and becomes managed. Additional data is acquired for the different applications.

Server Groups

Servers can be grouped together into Server Groups. An Server Group consists of the following attributes:

Name: The string displayed at the heading for a group of servers.
Id: An identifier used by the mapping table. The identifier is automatically generated.
Locked: A Boolean value indicating whether the class can be deleted.
Server List: List of associated servers.
Description: Text describing the server. Entered by User.

Framework For Remote Heterogeneous agent Management Method

Figure 6:
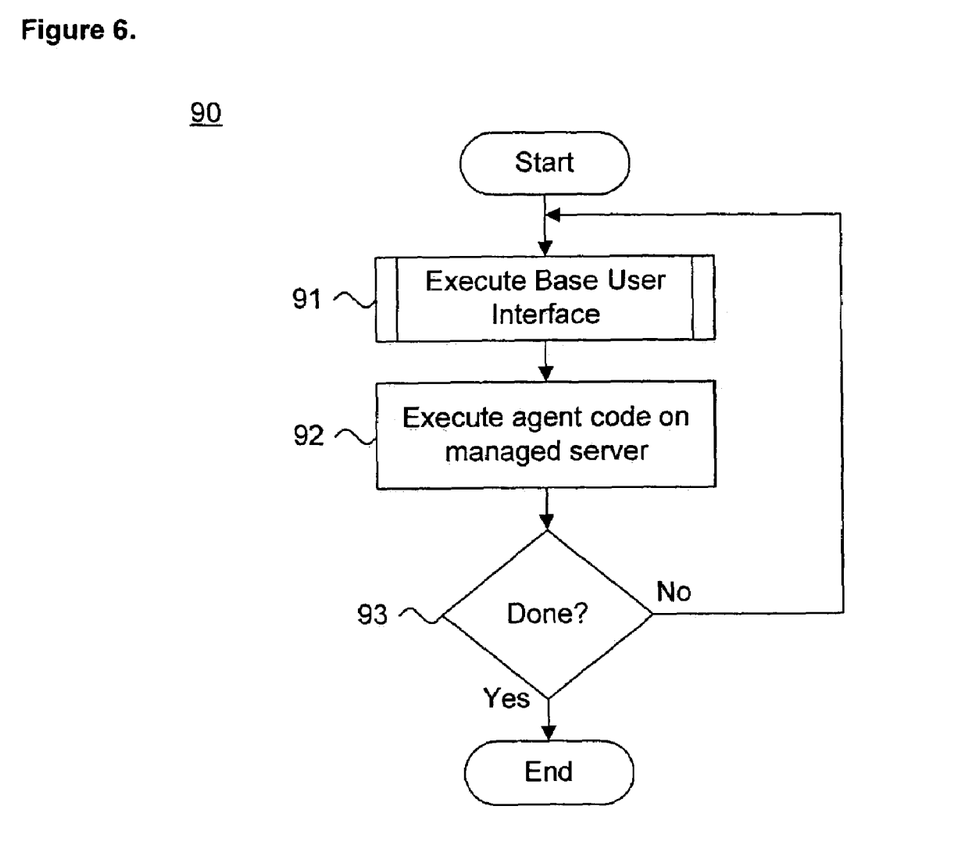
FIG. 6 is a flow diagram showing a method for providing a flexible framework for remote heterogeneous server management and control in accordance with an embodiment of the present invention.

FIG. 6 is a flow diagram showing a method for providing a flexible framework for remote heterogeneous server management and control in accordance with an embodiment of the present invention. The method executes as a continuous processing loop with the operation of the user system 11, each management station 16, and each managed server 17 (shown in FIG. 1) operating independently and non-concurrently. Thus, the base user interface (shown in FIG. 5) is presented on the browser 12 of the user system 11 of execution (block 91), as further described below with reference to FIG. 7. Finally, agent code is executed on each managed server 17 (shown in FIG. 1) (block 92) to provide server control and management. The process repeats (block 93), after which the method terminates.

Base User Interface Execution

Figure 7:
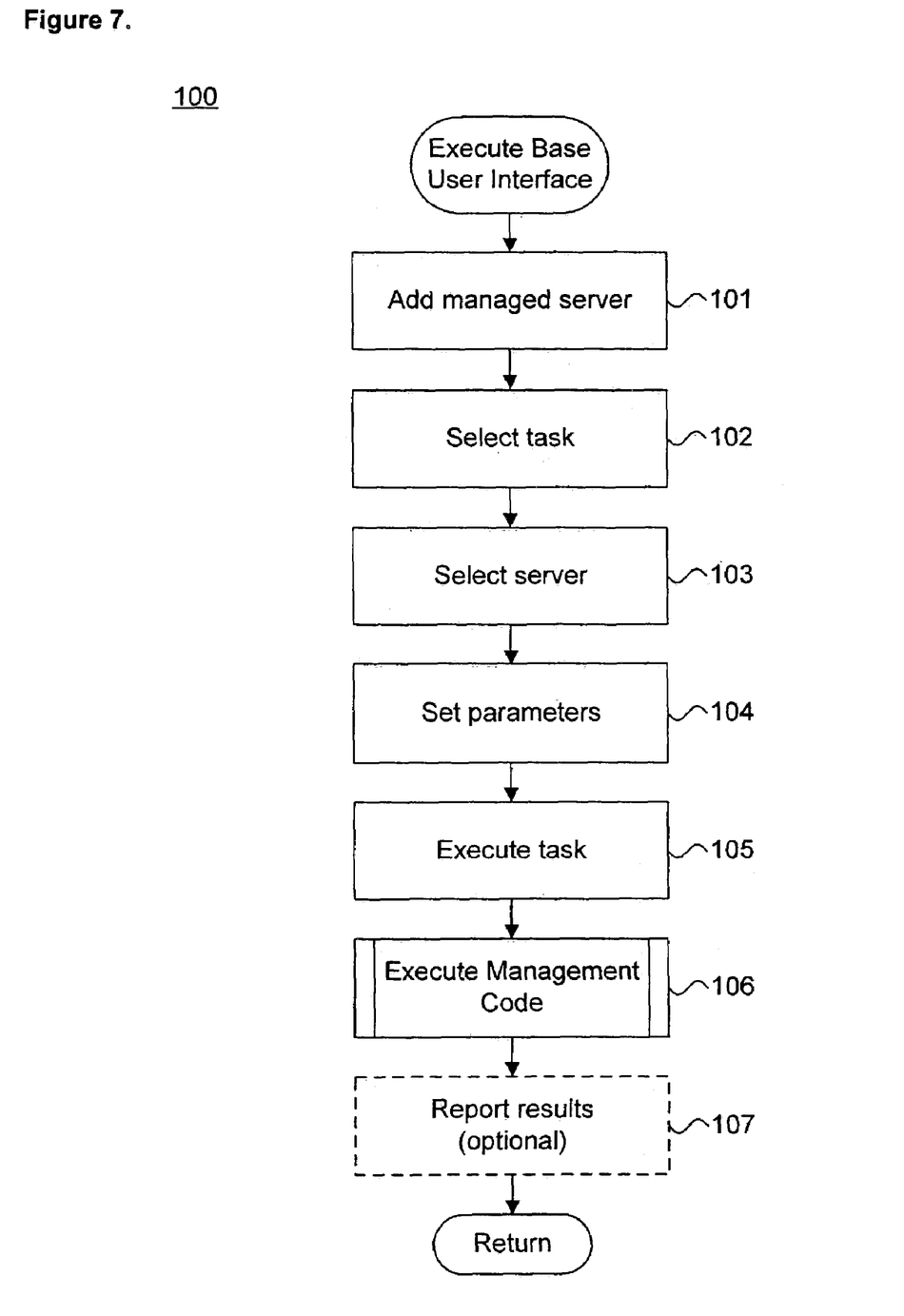
FIG. 7 is a flow diagram showing a routine for executing a base user interface for use in the method of FIG. 6.

FIG. 7 is a flow diagram showing a routine for executing a base user interface for use in the method of FIG. 6. The purpose of this routine is to facilitate the basic control flow at the operator level within the UI framework 31 (shown in FIG. 2).

First, each managed server 17 is added to the management station 16 (block 101). In the described embodiment, managed servers 17 are manually added. Once added, a server can be managed by the appropriate installed application modules. A task from a application module can be selected (block 102) using the task frame 81 (shown in FIG. 5) followed by the selection of one or more managed servers 17 for execution (block 103) using the presentation frame 82. Any necessary parameters are provided (block 104) and the selected task is executed (block 105). The management station code is then executed (block 106), as further described below with reference to FIG. 8. Optionally, results from the task execution are reported back through the base UI 80 (block 107). The routine then returns.

Management Station Execution

Figure 8:
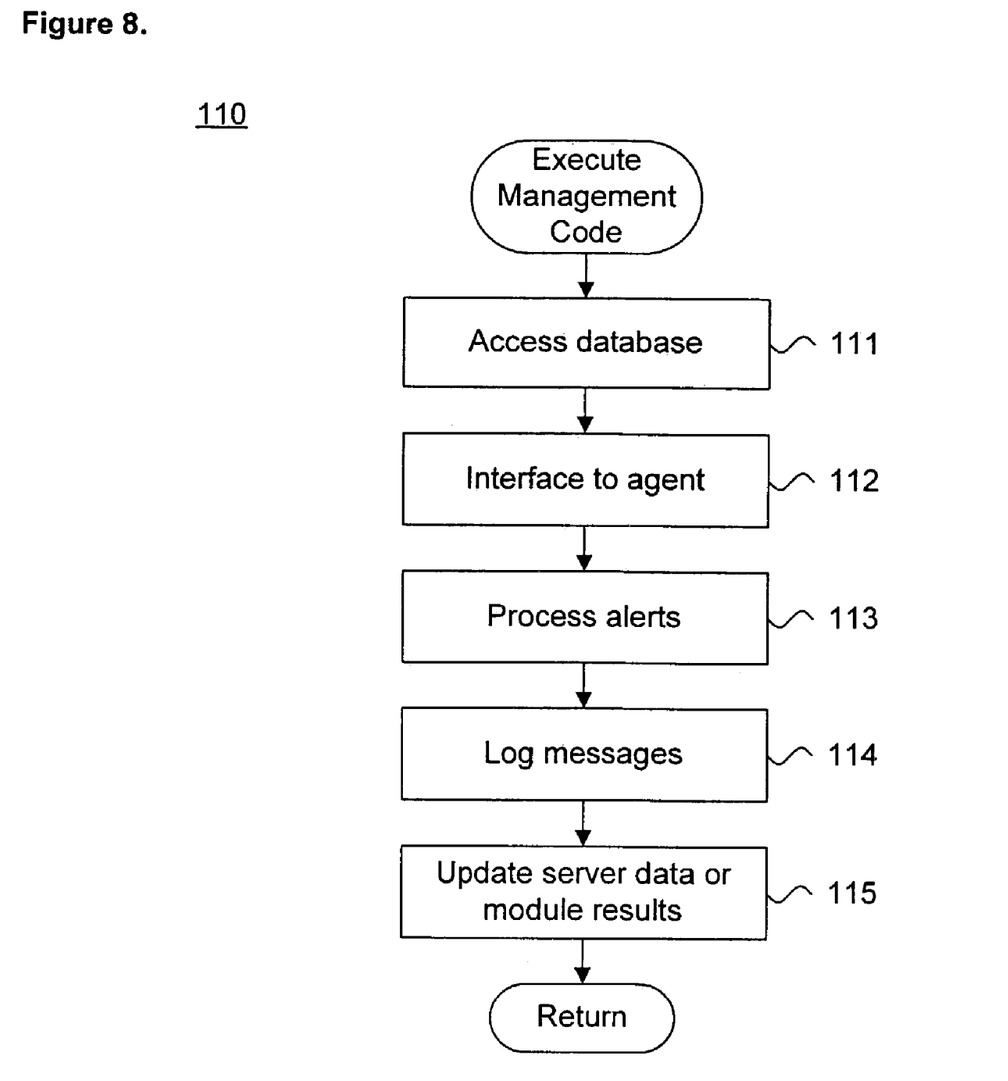
FIG. 8 is a flow diagram showing a routine for executing management station code for use in the method of FIG. 6.

FIG. 8 is a flow diagram showing a routine for executing management station code for use in the method of FIG. 6. The purpose of this routine is to facilitate the operations performed by a management station 16 (shown in FIG. 1). Note a management station 16 could perform one or all of these operations, depending on the operator instructions and agent population.

The database interface of the management station 16 allows applications to access the database 70 (shown in FIG. 4) (block 111). The base management framework on the management station 16 also includes an agent interface that allows application modules to interact directly with their counterpart on a server (block 112). The base management framework on the management station 16 includes an alert interface to process alerts viewable by the operator on the user station 11 (block 113) and a logging interface allows applications to write text messages into one or more shared logs on management station 16 (block 1114). The base management framework on the management station 16 interfaces to base server data to obtain information about managed servers. Finally, the server data or module results are updated (block 115). The routine then returns.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for providing a flexible framework for remote heterogeneous server management and control, comprising:

a user interface framework exporting control and display features in a platform-independent user interface effecting remote task execution and management of one or more remote heterogeneous agents responsive to user interaction on a user system;

a management station framework comprising services and base management functions implemented in management modules, the management station framework further generating the control and display features of the platform-independent user interface and maintaining a database storing management information; and an agent framework executing commands to control and returning results from one or more agents, the agent framework further comprising an interface loading and accessing agent code located on one or more applications deployed to each agent.

2. A computer system according to claim 1, further comprising:

management module definitions providing at least one management function selected from the group comprising:

an import module importing new servers to be managed under the management station framework;

a task management module enabling script and object code registration and scheduled execution;

a database interface providing an interface to a database under the management station framework storing information about managed servers and server-specific information;

an alert and logging interface providing an interface comprising at least one of allowing each application to display alerts and to log text messages;

an agent interface providing an interface to at least one such agent to enable direct interaction with an server; and a base server data interface providing an interface to an server to enable direct retrieval of information stored in a database under the management station framework.

3. A computer system according to claim 1, further comprising:

agent control definitions defining the agent control commands to provide at least one agent function selected from the group comprising:

a package manager installing and removing packages on behalf of a module manager and keeping track of at least one management station that has packages installed;

an agent ping module contacting at least one agent to verify connectivity;

a set agent password module setting an agent password;

a change agent password module changing the agent password;

a get agent version control getting a version of a specific agent; and a get registered packages module querying a list of installed management packages.

4. A computer system according to claim 1, further comprising:

a software management application to upgrade software on a list of managed servers, comprising a software management application function selected from the group comprising at least one of obtaining a list of installed software from a set of the managed servers, obtaining a set of available upgrades from an update server, and upgrading the installed software on the set of the managed servers.

5. A computer system according to claim 1, further comprising:

a management application to monitor a list of managed servers through at least one of polling each server for a status update and obtaining an asynchronous status update from managed servers.

6. A computer system according to claim 1, further comprising:

a management application to update a configuration of services on a managed server, comprising a configuration application function selected from the group comprising at least one of configuring a primary and a secondary nameserver, configuring a gateway, rebooting a set of managed servers, shutting down a set of managed servers, and configuring a service on a managed server.

7. A computer system according to claim 1, further comprising:
a management application to store inventory information about server composition, comprising an inventory application function selected from the group comprising at least one of generating a hardware report and generating a software report.

8. A computer system according to claim 1, further comprising:
a user system presenting the user interface as at least one of a graphical user interface and a command line interface.

9. A computer system according to claim 1, further comprising:
an executable script specifying the control and display features of the user interface.

10. A method for providing a flexible framework for remote heterogeneous server management and control, comprising:
generating a user interface framework exporting control and display features in a platform-independent user interface effecting remote task execution and management of one or more remote heterogeneous agents responsive to user interaction on a user system;
executing a management station framework comprising services and base management functions implemented in management modules, the management station framework further generating the control and display features of the platform-independent user interface and maintaining a database storing management information; and
providing an agent framework executing commands to control and returning results from one or more agents, the agent framework further comprising an interface loading and accessing agent code located on one or more applications deployed to each agent.

11. A method according to claim 10, further comprising:
defining the management modules to provide at least one management function selected from the group comprising:
importing new servers to be managed under the management station framework;
enabling script and object code registration and scheduled execution;
providing an interface to a database under the management station framework storing information about managed servers and server-specific information;
providing an interface comprising at least one of allowing each application to display alerts and to log text messages;
providing an interface to at least one such agent to enable direct interaction with an server; and
providing an interface to an server to enable direct retrieval of information stored in a database under the management station framework.

12. A method according to claim 10, further comprising:
defining the agent control commands to provide at least one agent function selected from the group comprising:
installing and removing packages on behalf of a module manager and keeping track of at least one management station that has packages installed;
contacting at least one agent to verify connectivity;
setting an agent password;
changing the agent password;
getting a version of a specific agent; and
querying a list of installed management packages.

13. A method according to claim 10, further comprising:
providing a software management application to upgrade software on a list of managed servers, comprising a software management application function selected from the group comprising at least one of:
obtaining a list of installed software from a set of the managed servers;
obtaining a set of available upgrades from an update server; and
upgrading the installed software on the set of the managed servers.

14. A method according to claim 10, further comprising:
providing a management application to monitor a list of managed servers through at least one of polling each server for a status update and obtaining an asynchronous status update from managed servers.

15. A method according to claim 10, further comprising:
providing a management application to update a configuration of services on a managed server, comprising a configuration application function selected from the group comprising at least one of:
configuring a primary and a secondary nameserver;
configuring a gateway;
rebooting a set of managed servers;
shutting down a set of managed servers; and
configuring a service on a managed server.

16. A method according to claim 10, further comprising:
providing a management application to store inventory information about server composition, comprising an inventory application function selected from the group comprising at least one of:
generating a hardware report; and
generating a software report.

17. A method according to claim 10, further comprising:
presenting the user interface as at least one of a graphical user interface and a command line interface.

18. A method according to claim 10, further comprising:
specifying the control and display features of the user interface as an executable script.

19. A computer-readable storage medium holding instructions that when executed by a computer cause the computer to perform a method for providing a flexible framework for remote heterogeneous server management and control, comprising:
code for generating a user interface framework exporting control and display features in a platform-independent user interface effecting remote task execution and management of one or more remote heterogeneous agents responsive to user interaction on a user system;
code for executing a management station framework comprising services and base management functions implemented in management modules, the management station framework further generating the control and display features of the platform-independent user interface and maintaining a database storing management information; and
code for providing an agent framework executing commands to control and returning results from one or more agents, the agent framework further comprising an interface loading and accessing agent code located on one or more applications deployed to each agent.

20. A computer-readable storage medium according to claim 19, further comprising:
code for defining the management modules to provide at least one management function selected from the group comprising:
importing new servers to be managed under the management station framework;
enabling script and object code registration and scheduled execution;
providing an interface to a database under the management station framework storing information about managed servers and server-specific information;
providing an interface comprising at least one of allowing each application to display alerts and to log text messages; providing an interface to at least one such agent to enable direct interaction with an server; and
providing an interface to an server to enable direct retrieval of information stored in a database under the management station framework.

21. A computer-readable storage medium according to claim 19, further comprising:
code for defining the agent control commands to provide at least one agent function selected from the group comprising:
installing and removing packages on behalf of a module manager and keeping track of at least one management station that has packages installed;
contacting at least one agent to verify connectivity;
setting an agent password;
changing the agent password;
getting a version of a specific agent; and
querying a list of installed management packages.

22. A computer-readable storage medium according to claim 19, further comprising:
code for providing a software management application to upgrade software on a list of managed servers, comprising a software management application function selected from the group comprising at least one of:
obtaining a list of installed software from a set of the managed servers;
obtaining a set of available upgrades from an update server; and
upgrading the installed software on the set of managed servers.

23. A computer-readable storage medium according to claim 19, further comprising:
code for providing a management application to monitor a list of managed servers through at least one of polling each server for a status update and obtaining an asynchronous status update from managed servers.

24. A computer-readable storage medium according to claim 19, further comprising:
code for providing a management application to update a configuration of services on a managed server, comprising a configuration application function selected from the group comprising at least one of:
configuring a primary and a secondary nameserver;
configuring a gateway;
rebooting a set of managed servers;
shutting down a set of managed servers; and
configuring a service on a managed server.

25. A computer-readable storage medium according to claim 19, further comprising:
code for providing a management application to store inventory information about server composition, comprising an inventory application function selected from the group comprising at least one of:
generating a hardware report; and
generating a software report.

26. A computer-readable storage medium according to claim 19, further comprising:
code for presenting the user interface as at least one of a graphical user interface and a command line interface.

27. A computer-readable storage medium according to claim 19, further comprising:
code for specifying the control and display features of the user interface as an executable script.

28. An apparatus for providing a flexible framework for providing a flexible framework for remote heterogeneous server management and control, comprising:
means for generating a user interface framework exporting control and display features in a platform-independent user interface effecting remote task execution and management of one or more remote heterogeneous agents responsive to user interaction on a user system;
means for executing a management station framework comprising services and base management functions implemented in management modules, the management station framework further generating the control and display features of the platform-independent user interface and maintaining a database storing management information; and
means for providing an agent framework executing commands to control and returning results from one or more agents, the agent framework further comprising an interface loading and accessing agent code located on one or more applications deployed to each agent.

29. An apparatus according to claim 28, further comprising:
means for defining the management modules to provide at least one management function selected from the group comprising:
means for importing new servers to be managed under the management station framework;
means for enabling script and object code registration and scheduled execution;
means for providing an interface to a database under the management station framework storing information about managed servers and server-specific information;
means for providing an interface comprising at least one of allowing each application to display alerts and to log text messages;
means for providing an interface to at least one such agent to enable direct interaction with an server; and
means for providing an interface to an server to enable direct retrieval of information stored in a database under the management station framework.

30. An apparatus according to claim 28, further comprising:
means for defining the agent control commands to provide at least one agent function selected from the group comprising:
means for installing and removing packages on behalf of a module manager and keeping track of at least one management station that has packages installed;
means for contacting at least one agent to verify connectivity;
means for setting an agent password;
means for changing the agent password;
means for getting a version of a specific agent; and means for querying a list of installed management packages.

31. An apparatus according to claim 28, further comprising:
   means for providing a software management application to upgrade software on a list of managed servers, comprising a software management application function selected from the group comprising at least one of:
   means for obtaining a list of installed software from a set of the managed servers;
   means for obtaining a set of available upgrades from an update server; and
   means for upgrading the installed software on the set of the managed servers.

32. An apparatus according to claim 28, further comprising:
   means for providing a management application to monitor a list of managed servers through at least one of polling each server for a status update and obtaining an asynchronous status update from managed servers.

33. An apparatus according to claim 28, further comprising:
   means for providing a management application to update a configuration of services on a managed server, comprising a configuration application function selected from the group comprising at least one of:
   means for configuring a primary and a secondary nameserver;
   means for configuring a gateway;
   means for rebooting a set of managed servers;
   means for shutting down a set of managed servers; and
   means for configuring a service on a managed server.

34. An apparatus according to claim 28, further comprising:
   means for providing a management application to store inventory information about server composition, comprising an inventory application function selected from the group comprising at least one of:
   means for generating a hardware report; and
   means for generating a software report.

35. An apparatus according to claim 28, further comprising:
   means for presenting the user interface as at least one of a graphical user interface and a command line interface.

36. An apparatus according to claim 28, further comprising:
   means for specifying the control and display features of the user interface as an executable script.

* * * * *